US007705950B2

(12) United States Patent
Lin

(10) Patent No.: US 7,705,950 B2
(45) Date of Patent: Apr. 27, 2010

(54) LIQUID CRYSTAL DISPLAY

(75) Inventor: Hsiang-Lin Lin, Changhua County (TW)

(73) Assignee: AU Optronics Corp., Hsin-Chu (TW)

(*) Notice: Subject to any disclaimer, the term of this patent is extended or adjusted under 35 U.S.C. 154(b) by 454 days.

(21) Appl. No.: 11/382,059

(22) Filed: May 8, 2006

(65) Prior Publication Data

US 2007/0236414 A1 Oct. 11, 2007

(30) Foreign Application Priority Data

Mar. 28, 2006 (TW) .............................. 95110813 A

(51) Int. Cl.
*G02F 1/1343* (2006.01)

(52) U.S. Cl. ....................................... 349/144; 349/141

(58) Field of Classification Search ....................... None
See application file for complete search history.

(56) References Cited

U.S. PATENT DOCUMENTS 5,473,455 A * 12/1995 Koike et al. ................. 349/124
6,288,763 B1 * 9/2001 Hirota ........................ 349/141
6,839,099 B2 * 1/2005 Fukunishi .................... 349/54
7,206,054 B2 * 4/2007 Kim .......................... 349/144
2002/0036744 A1 * 3/2002 Kubo et al. ................. 349/144
2005/0046764 A1 * 3/2005 Enda et al. .................... 349/43
2005/0105010 A1 5/2005 Oh

FOREIGN PATENT DOCUMENTS

CN 1591151 A 3/2005
CN 1619396 A 5/2005

* cited by examiner

*Primary Examiner*—David Nelms
*Assistant Examiner*—Lucy P Chien
(74) *Attorney, Agent, or Firm*—Winston Hsu

(57) ABSTRACT

A liquid crystal display includes: a substrate; a plurality of pixel electrodes formed on the substrate and arranged corresponding to a pixel array; a first data line and a second data line formed on the substrate; a plurality of scan lines formed on the substrate, in which the scan lines cross the first data line and the second data line; a first branch electrode electrically connects a pixel electrode and partially overlaps the first data line; and a second branch electrode electrically connects the pixel electrode and partially overlaps the second data line, in which the first branch electrode and the second branch electrode are disposed opposite to the pixel electrode.

10 Claims, 19 Drawing Sheets

LIQUID CRYSTAL DISPLAY

BACKGROUND OF THE INVENTION

1. Field of the Invention

The present invention relates to a thin-film transistor liquid crystal display (TFT-LCD), and more particularly, to a liquid crystal display with a capacitance-compensated structure.

2. Description of the Prior Art

Due to the overlay shift between the pixel electrodes and the data lines caused by process variations, a parasitic capacitance (Cpd, Cpd') is produced and causes a cross-talk phenomenon, as shown in FIG. 1. Additionally, the shot mura issue produced by the exposure process will also affect the picture quality. These are the major factors limiting the design of the aperture ratio.

There are many ways to decrease the parasitic capacitance and increase the aperture ratio. For example, a shielding capacitor and a polymer insulation film can be added between the data line and the pixel electrode to decrease the parasitic capacitance. As a result, the pixel electrode is able to overlap the data line thereby achieving a high aperture ratio. The primary factor influencing the reduction of the parasitic capacitance is related to the dielectric constant and the film thickness (i.e., the distance between the pixel electrode and the data line) of the polymer insulation film. However, as stated, influencing the reduction of parasitic capacitance is related to and limited by the development of polymer insulation film material. The dielectric constant of the polymer insulation film and the film thickness are possibly changed due to the other process steps, and thus influence the parasitic capacitance. Therefore, the overlap between the pixel electrode and the data line remain the cause of the unbalance of the parasitic capacitance as well as cross-talk and other defects.

In order to eliminate the parasitic capacitance effect, driving principles including dot inversion and column inversion (i.e., the polarity of two neighboring data line signals are opposite at the same time) are used to cancel the Cpd and Cpd'. Moreover, the ΔCpd will be minimized if the overlap areas between the pixel electrode and the data lines are the same.

The overlap area can be fixed when designing the photo mask as shown in FIG. 2. However, the original design value can be varied due to the overlay shift in the manufacturing process. The overlap areas between the pixel electrodes and the data lines will be changed and cause the parasitic capacitance unbalance as shown in FIG. 3.

SUMMARY OF THE INVENTION

Accordingly, an object of the invention is to provide a liquid crystal display with a capacitance-compensated structure, which can compensate for the effect of the parasitic capacitance. Moreover, the phenomena of cross-talk or shot mura caused by the overlay shift between the data line and the pixel electrode will be solved.

Another object of the invention is to provide a liquid crystal display with a capacitance-compensated structure, wherein the two opposite sides of the pixel electrode are added with a branch electrode respectively. The branch electrodes are able to balance the parasitic capacitance caused by the overlay shift between the pixel electrode and its neighboring data lines. The dot inversion and column inversion driving principles are used to balance the Cpd and Cpd'. Moreover, the structure can reduce the cross-talk and the unbalance of Cpd and Cpd' caused by shot mura.

The present invention can be also applied in the zigzag data line and the pixel delta array to effectively solve the parasitic capacitance problem.

These and other objectives of the present invention will no doubt become obvious to those of ordinary skill in the art after reading the following detailed description of the preferred embodiment that is illustrated in the various figures and drawings.

DETAILED DESCRIPTION

Branch electrodes on each side of pixel electrodes compensate for the parasitic capacitance when overlay shift occurs. Additionally, the present invention compensates for the parasitic capacitance between pixel electrodes and data lines. The preferred embodiments are described below.

First Embodiment

Figure 1:
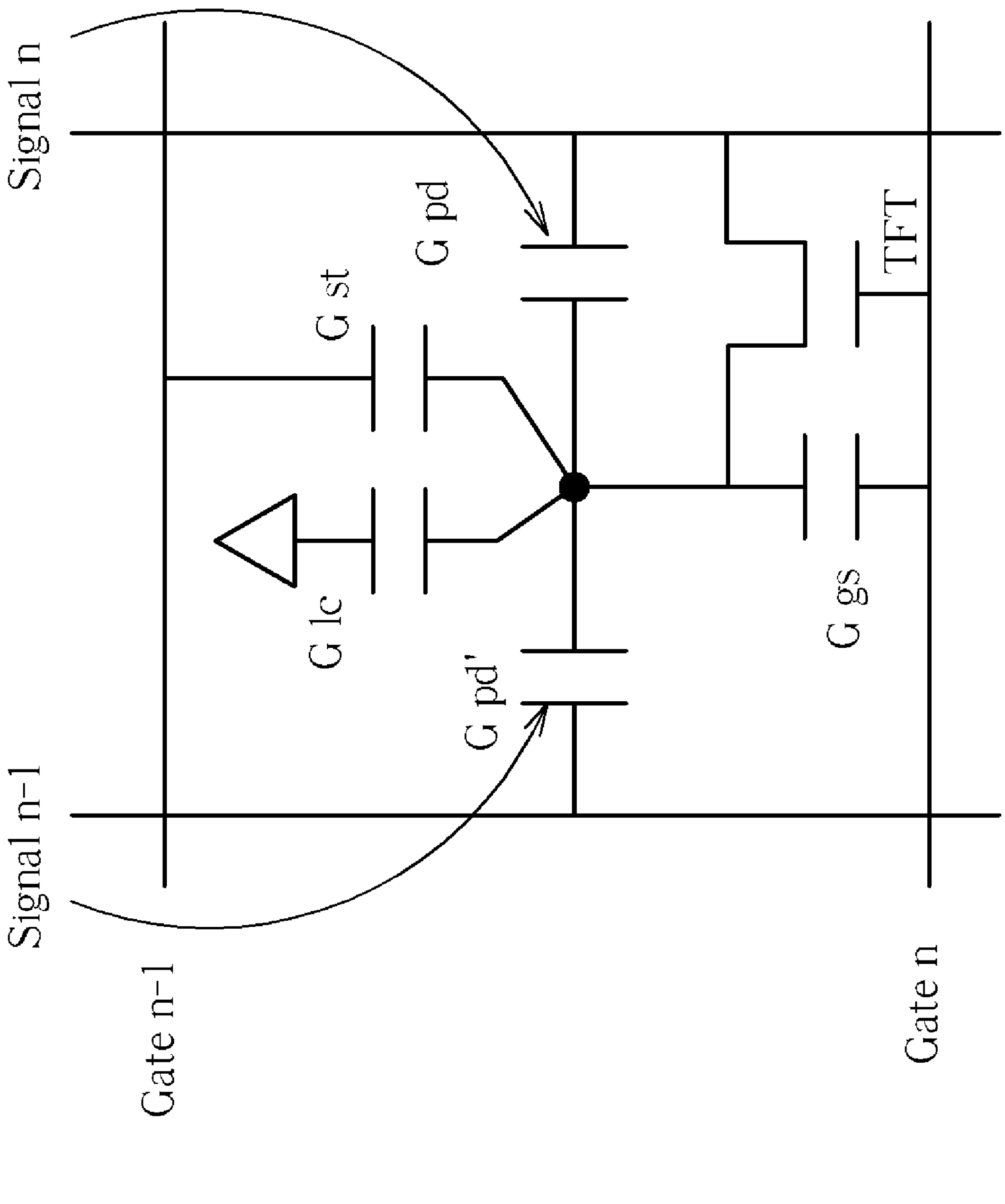
FIG. 1 is an equivalent circuit diagram of the liquid crystal display.
Figure 2:
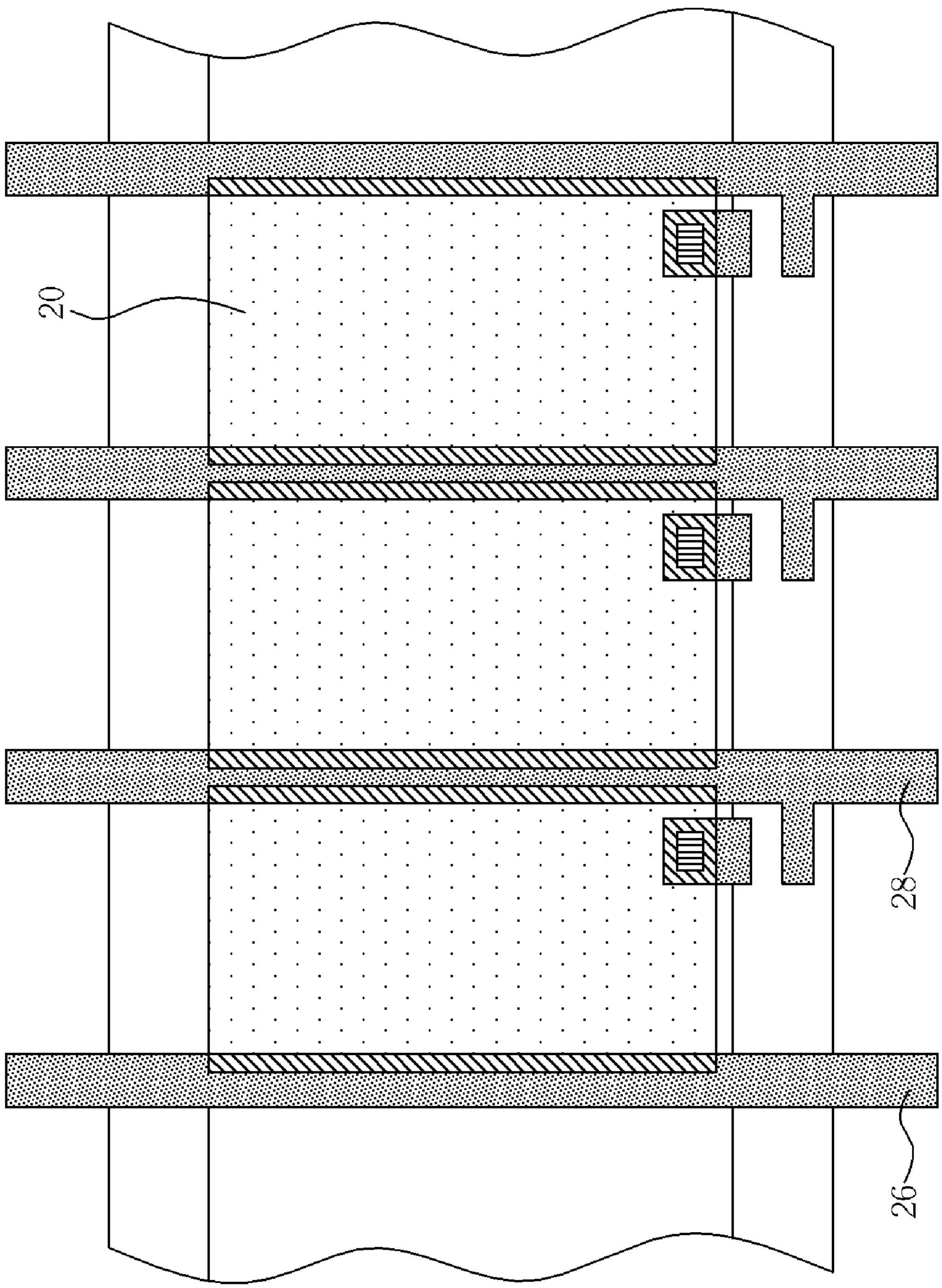
FIG. 2 is a plane view of the pixel area of a conventional liquid crystal display.
Figure 3:
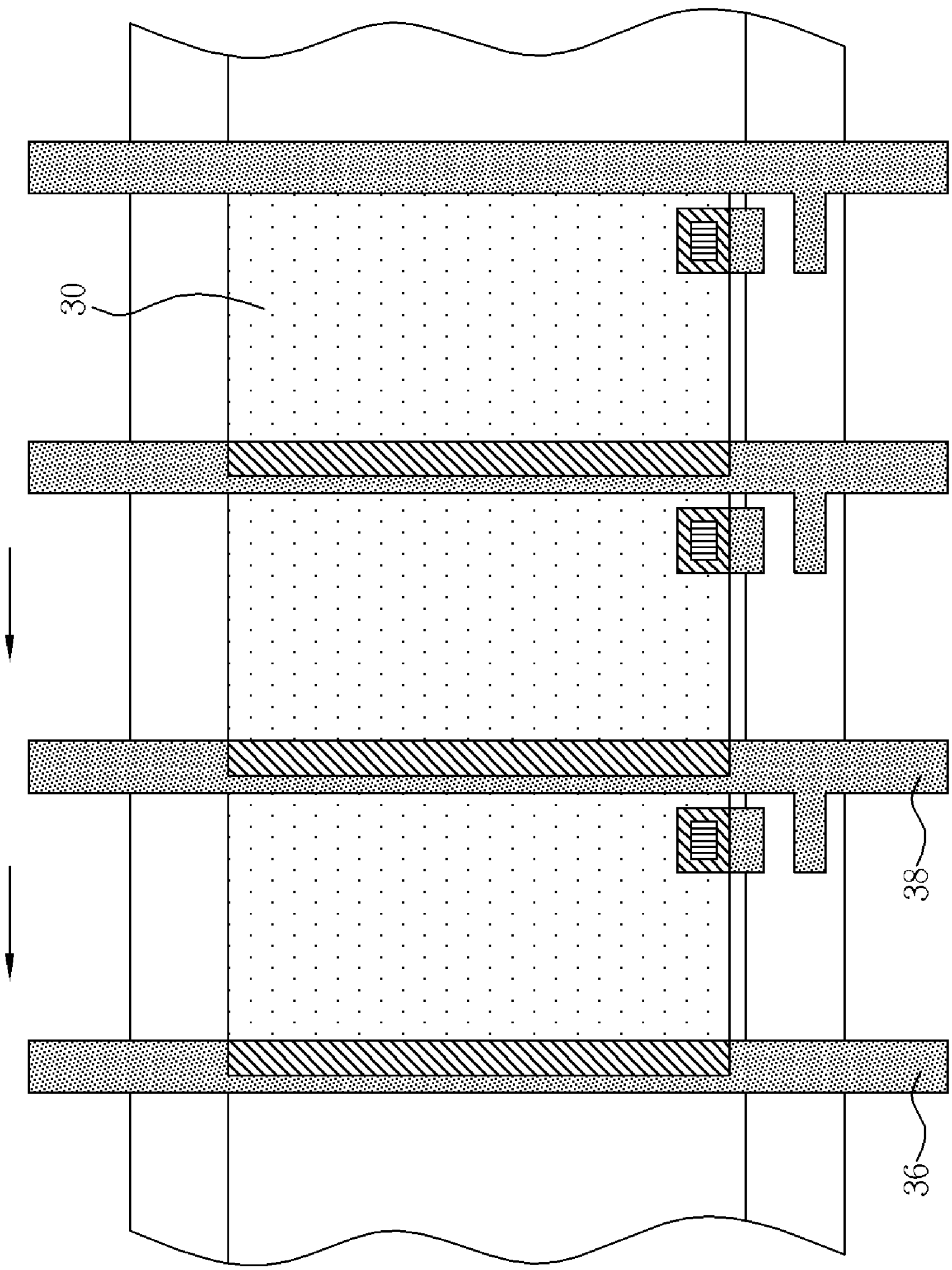
FIG. 3 is a plane view of the pixel area with the overlay shift between the pixel electrode and the data line according to the prior art.
Figure 4:
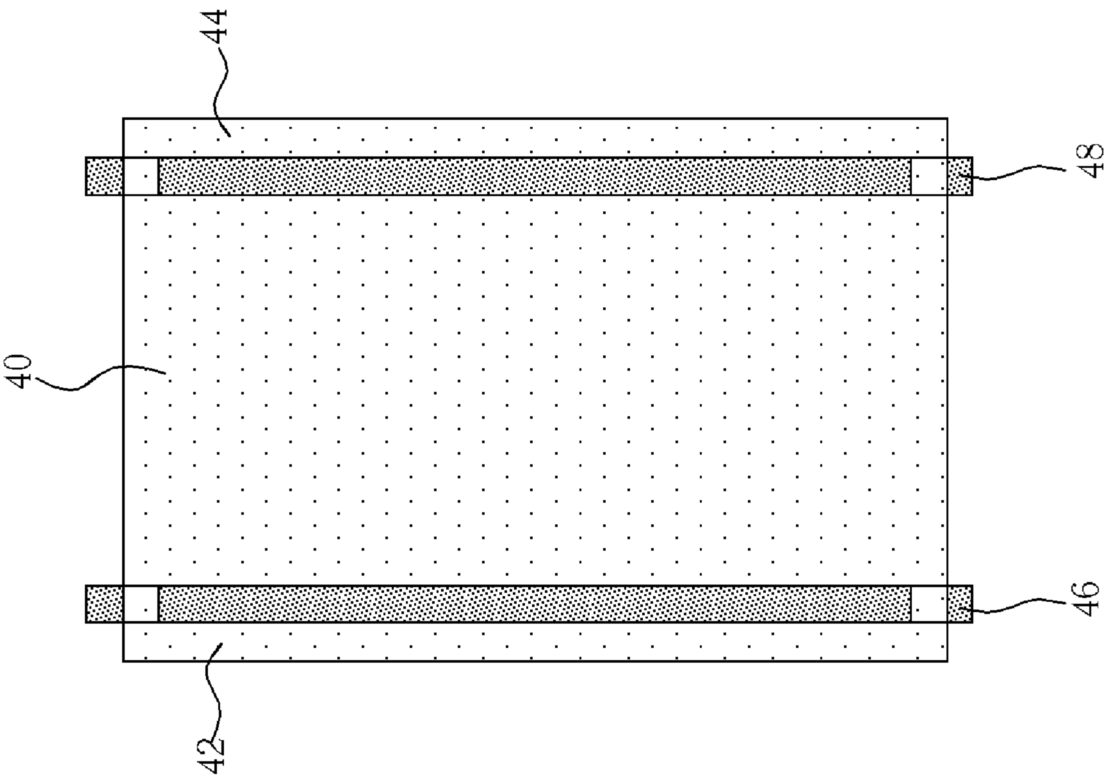
FIG. 4 is a plane view of the pixel electrode and the data line.

FIG. 4 shows the plane view of the pixel electrode and the data line of this embodiment. As shown in FIG. 4, the pixel electrode 40 is aligned to the data lines 46 and 48, and the pixel electrode 40 does not overlap the data lines 46 and 48. Additionally, a first branch electrode 42 and a second branch electrode 44 are respectively disposed on the opposite side of the pixel electrode corresponding to the data lines 46 and 48. Preferably, a gap is formed between the first branch electrode 42 and the pixel electrode 40 and another gap is formed between the second brand electrode 44 and the pixel electrode 40. The first branch electrode 42 and the second branch electrode 44 are electrically connected to the pixel electrode 40.

Figure 5:
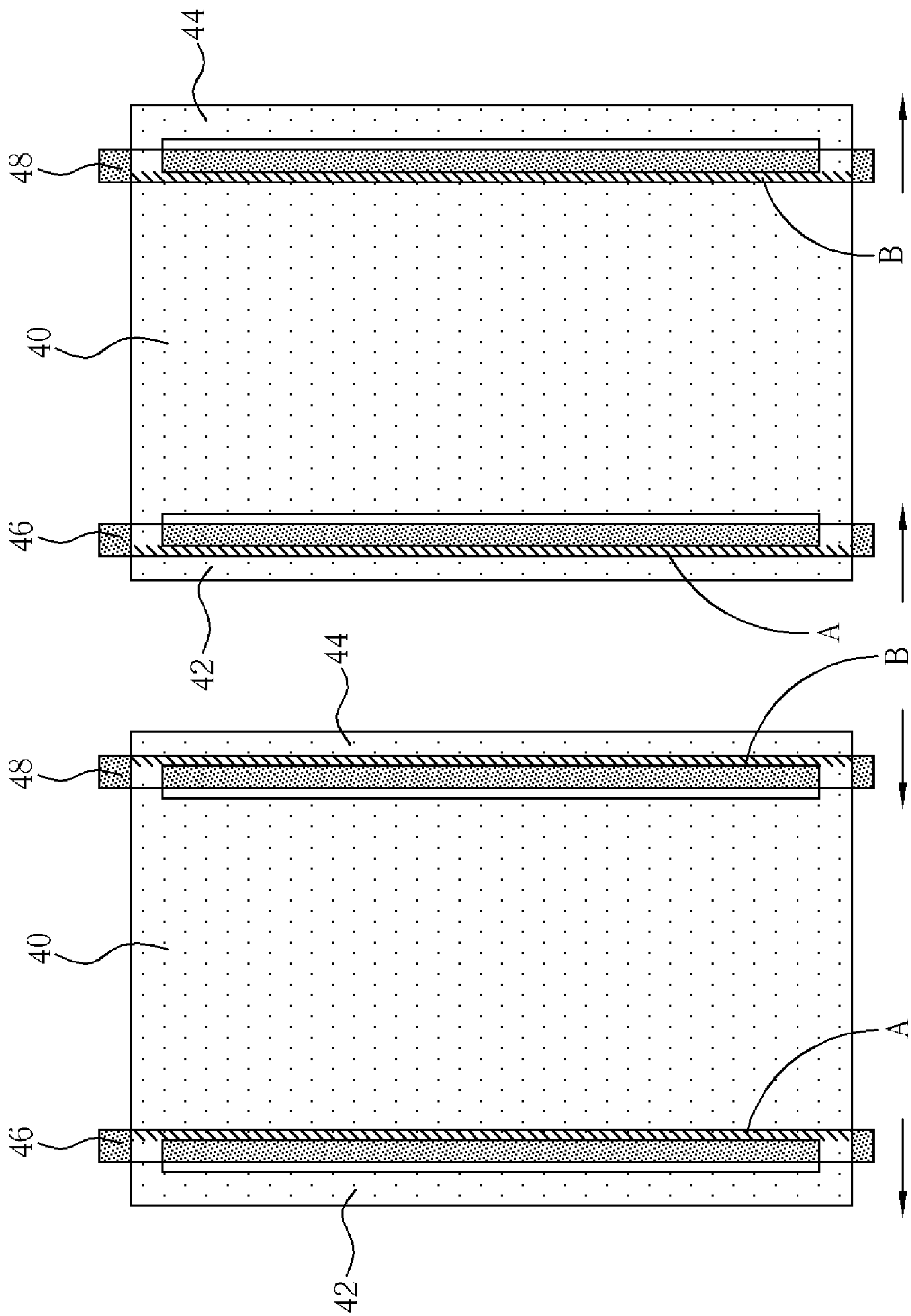
FIG. 5 is a plane view of the pixel area of the invention with overlay shift.

FIG. 5 shows the overlay shift between the pixel electrode 40 and the data lines 46 and 48. As shown in FIG. 5, an overlap area A between the pixel electrode 40 and the first data line 46 and an overlap area B between the second branch electrode 44 and the second data line 48 are increased when the pixel electrode 40 shifts to the left, in which the overlap area A is equal to the overlap area B. On the other hand, the overlap area A between the pixel electrode 40 and the first data line 46 and the overlap area B between the second branch electrode 44 and the second data line 48 are also increased when the pixel electrode 40 shifts to the right. Similarly, the overlap area A is equal to the overlap area B. As a result, the overlap areas for compensating for the overlay shift are the same.

Second Embodiment

Figure 6:
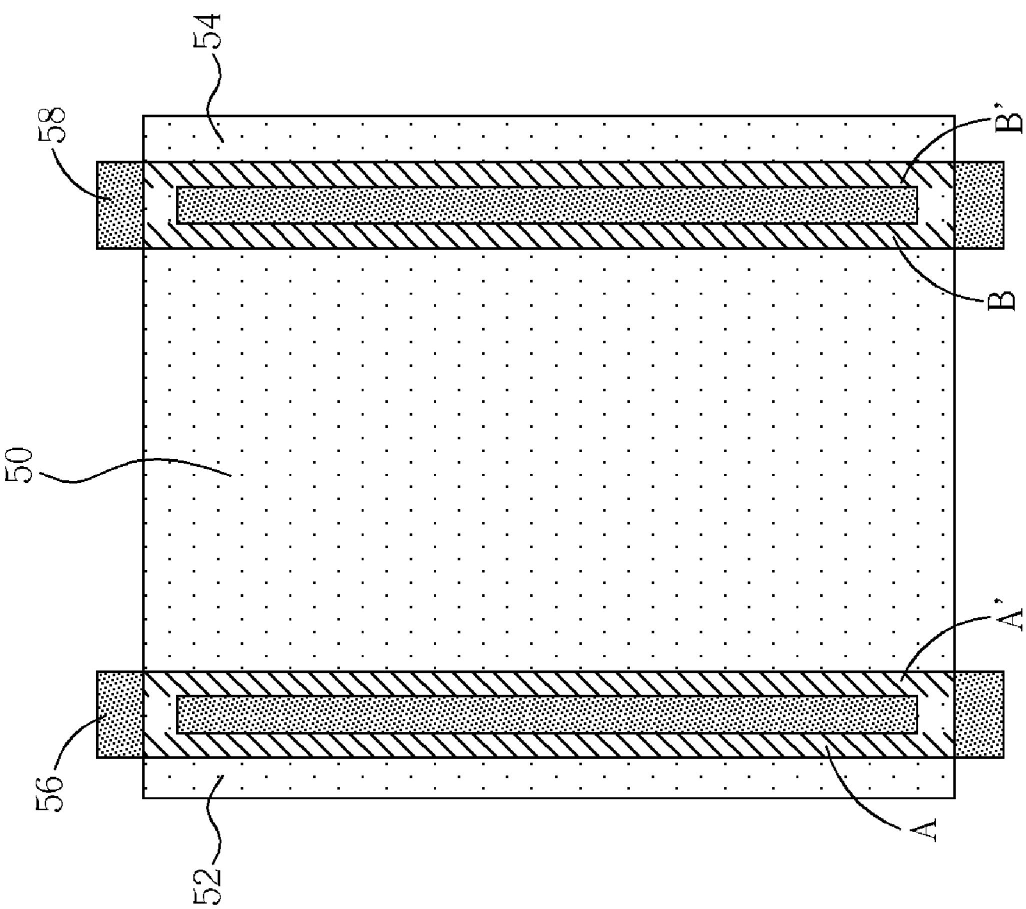
FIG. 6 is a plane view of the pixel electrode and the data line.

FIG. 6 shows the mask design of the pixel electrode and the data lines of this embodiment. As shown in FIG. 6, the pixel electrode 50 overlaps the first data line 56 with an area A'. The pixel electrode 50 overlaps the second data line 58 with an area B. The first branch electrode 52 overlaps the first data line 56 with an area A. The second branch electrode 54 overlaps the second data line 58 with an area B'. The summation of A and A' is equal to B and B'.

Figure 7:
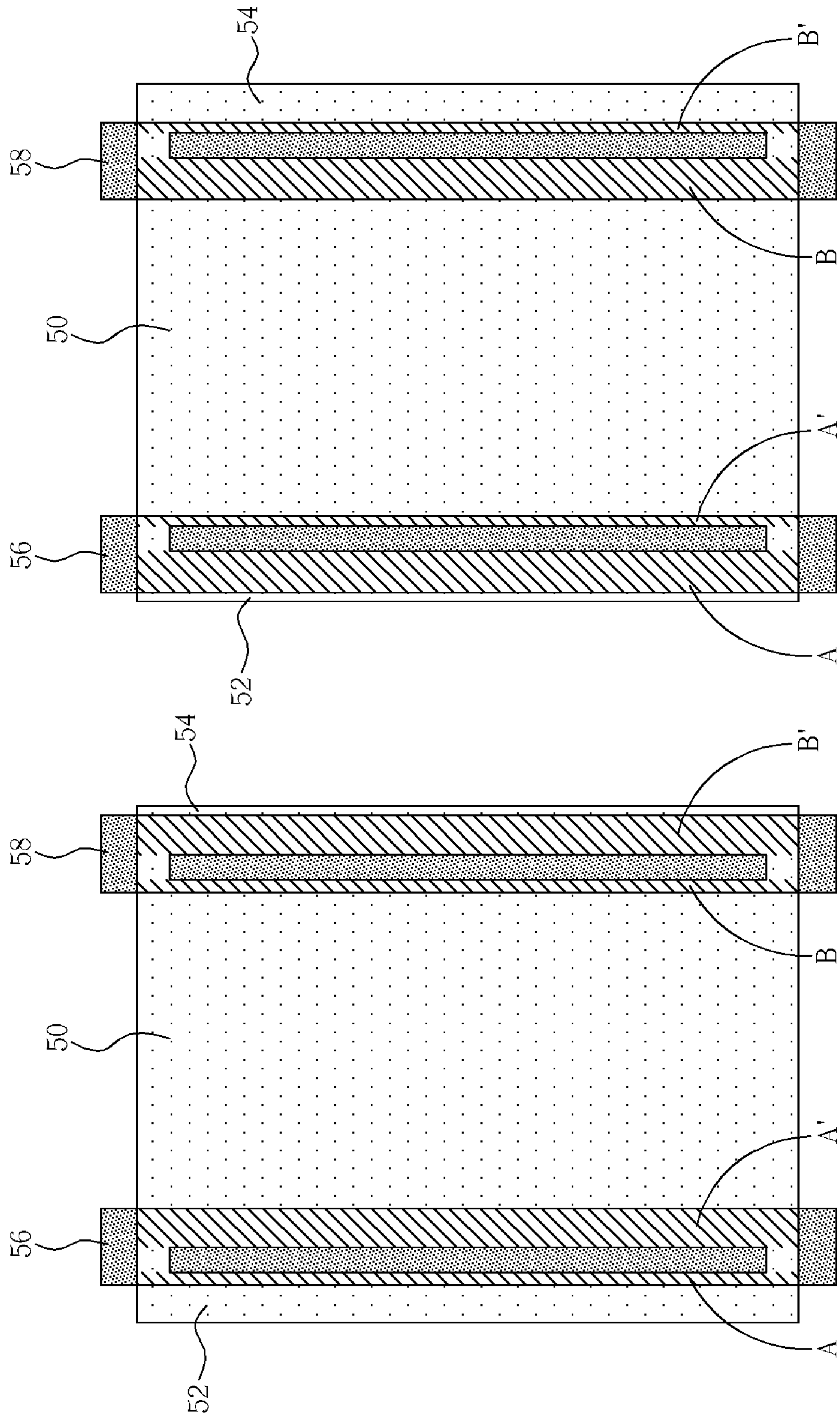
FIG. 7 is a plane view of the pixel area of the invention with overlay shift.

FIG. 7 shows the overlay shift between the pixel electrode 50 and the data lines 56 and 58. As shown in FIG. 7, the overlap area A' between the pixel electrode 50 and the first data line 56 and the overlap area B' between the second branch electrode 54 and the second data line 58 increase, and the overlap area A between the first branch electrode 52 and the first data line 56 and the overlap area B between the pixel electrode 50 and the second data line 58 decrease when the pixel electrode 50 shift to the left. On the other hand, the overlap area A' between the pixel electrode 50 and the first data line 56 and the overlap area B' between the second branch electrode 54 and the second data line 58 decrease and the overlap area A between the first branch electrode 52 and the first data line 56 and the overlap area B between the pixel electrode 50 and the second data line 58 increase when the pixel electrode 50 shift to the right.

Despite the fact that the pixel electrode 50 shifts to left or right, the summation of the overlap area A between the first branch electrode 52 and the first data line 56 and the overlap area A' between the pixel electrode 50 and the first data line 56 is equal to the summation of the overlap area B between the pixel electrode 50 and the second data line 58 and the overlap area B' between the second branch electrode 54 and the second data line 58. Hence, the ΔCpd minimizes as A plus A' is equal to B plus B'.

Third Embodiment

Figure 8:
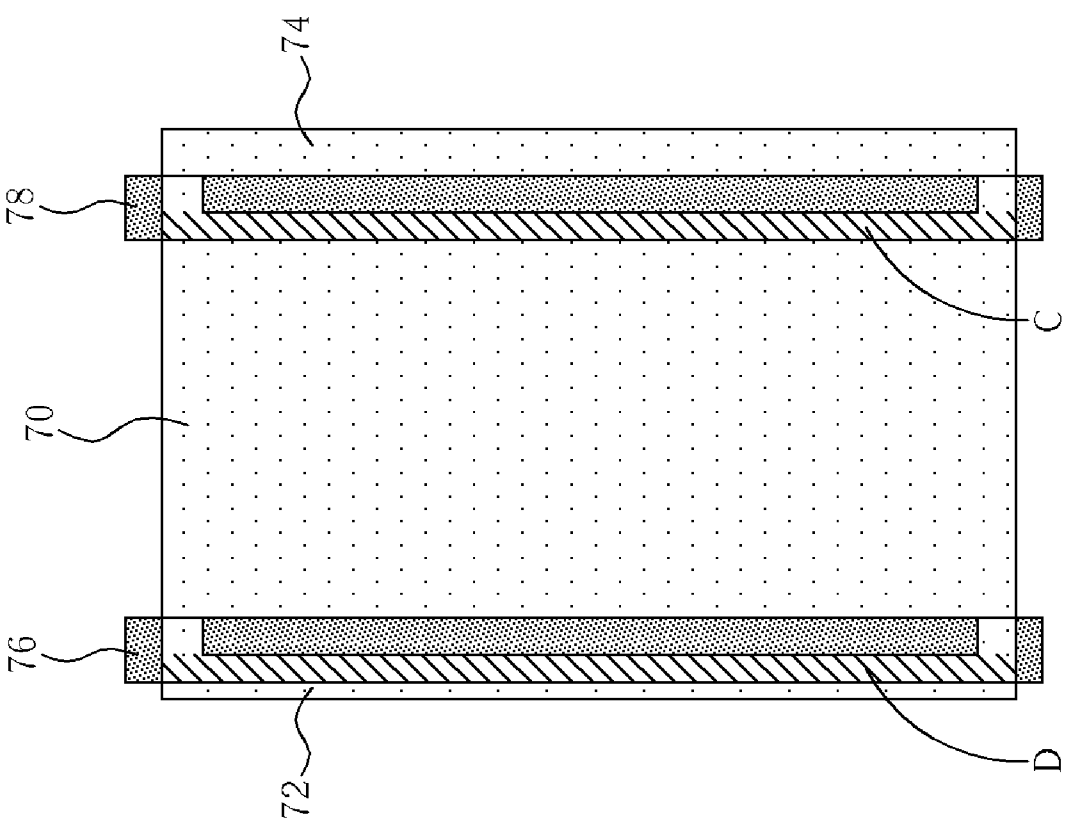
FIG. 8 is a plane view of the pixel electrode and the data line.

FIG. 8 shows the mask design of the pixel electrode and the data lines of this embodiment. As shown in FIG. 8, the pixel electrode is aligned with the right side of the first data line 76. The second branch electrode 74 is aligned with the right side of the second data line 78. The pixel electrode 70 overlaps the second data line 78 with an area C. The first branch electrode 72 overlaps the first data line 76 with an area D. The overlap area C is equal to D.

Figure 9:
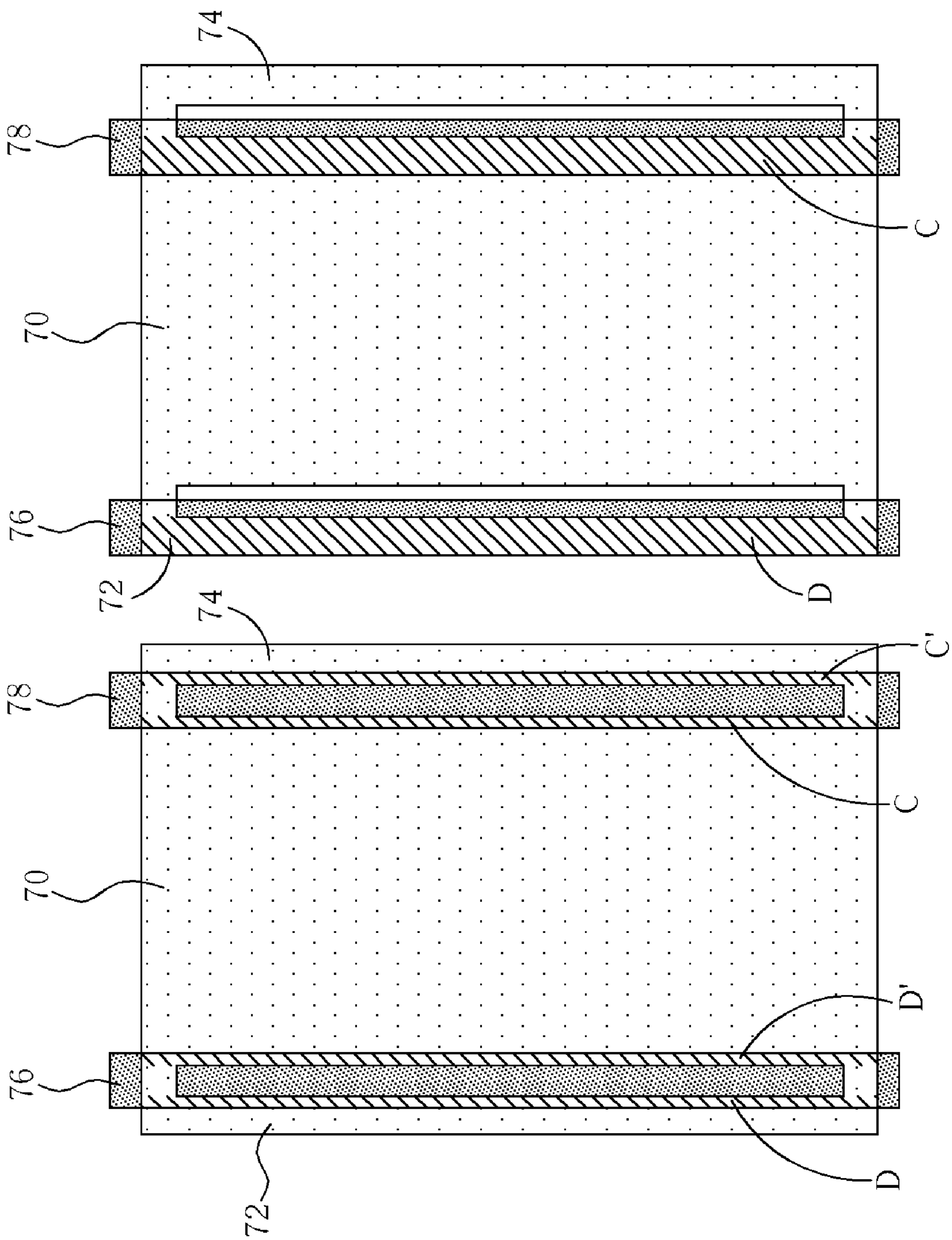
FIG. 9 is a plane view of the pixel area of the invention with overlay shift.

FIG. 9 shows the overlay shift between the pixel electrode 70 and the data lines 76 and 78. As shown in FIG. 9, when the pixel electrode 70 shifts to left, the pixel electrode 70 overlaps the first data line 76 with an area D' and the second branch electrode 74 overlaps the second data line 78 with an area C', while the overlap area D between the first branch electrode 72 and the first data line 76 and the overlap area C between the pixel electrode 70 and the second data line 78 are decreased. Nevertheless, the overlap area C+C' remains equal to or close to the over lap area D+D'. On the other hand, the overlap area D between the first branch electrode 72 and the first data line 76 and the overlap area C between the pixel electrode 70 and the second data line 78 increase when the pixel electrode 70 shifts to right.

Figure 10:
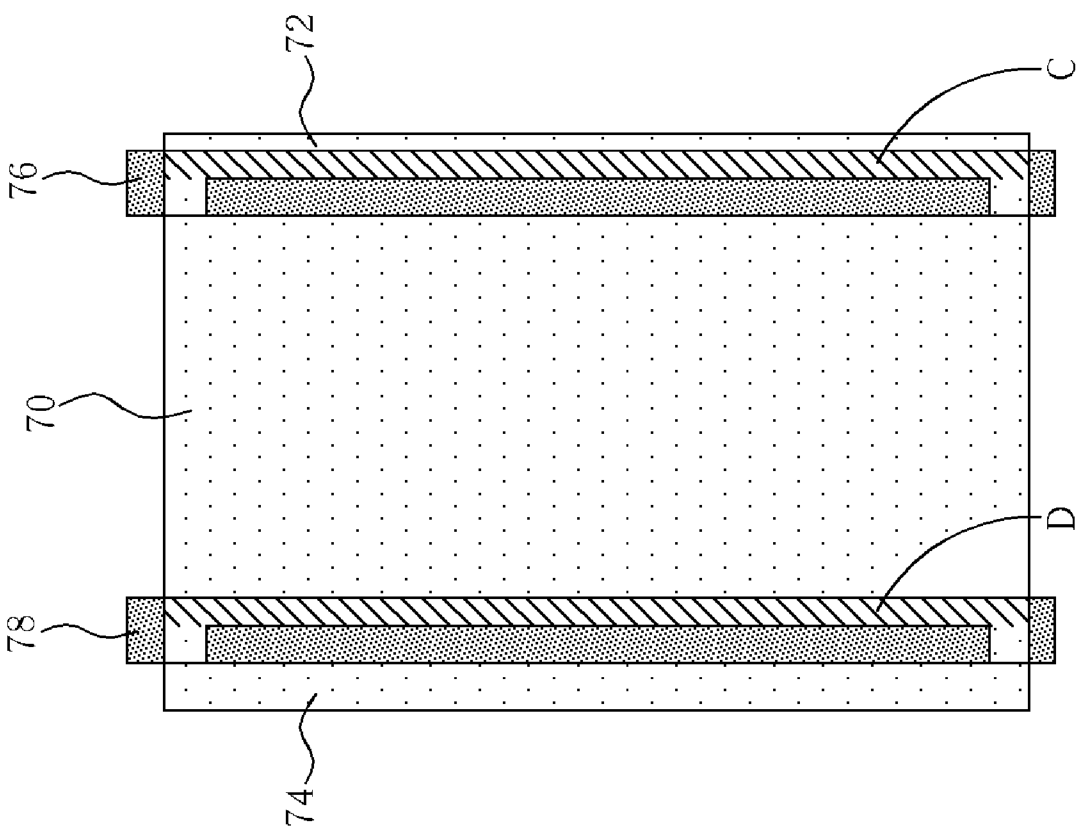
FIG. 10 is a plane view of the pixel electrode and the data line.

The overlap area of the mask design can be disposed on the left side of both the first data line 76 and the second data line 78 as shown in FIG. 8, or on the right side of both the first data line 76 and the second data line 78 as shown in FIG. 10. When the pixel electrode 70 shifts to left or right, the total overlap area between the first data line 76 and the first branch electrode 72 and the pixel electrode 70 is equal to the total overlap area between the second data line 78 and the second branch electrode 74 and the pixel electrode 70.

Fourth Embodiment

Figure 11:
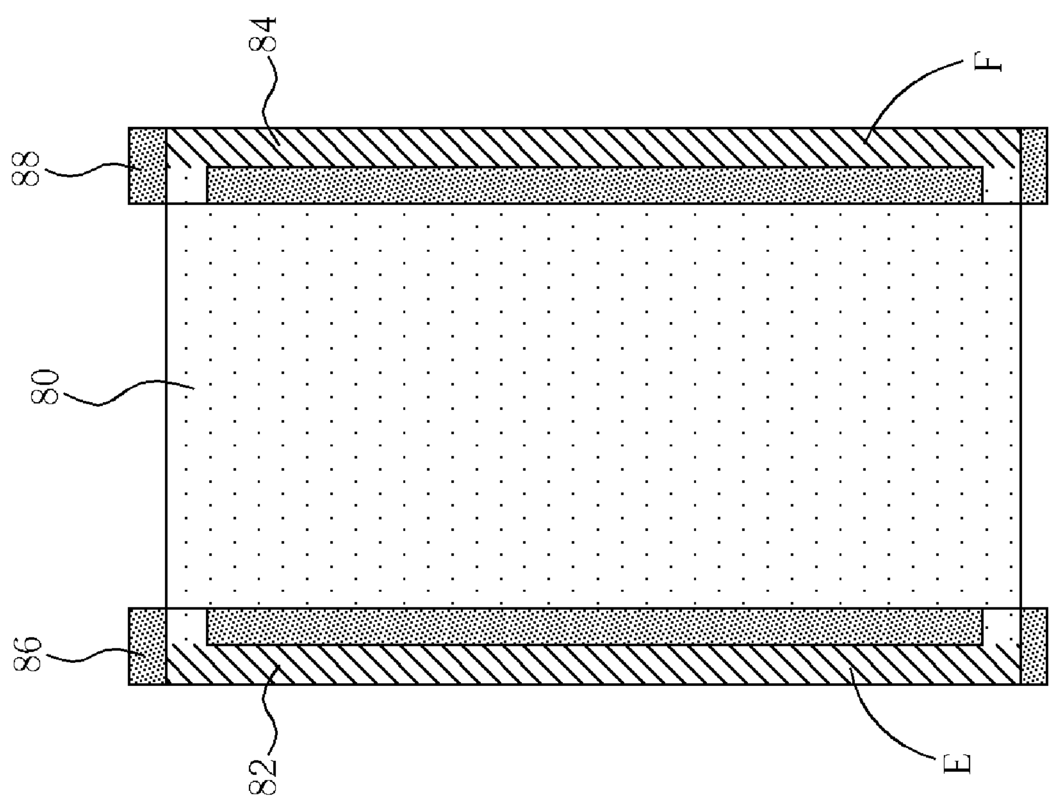
FIG. 11 is a plane view of the pixel electrode and the data line.

FIG. 11 shows the mask design of the pixel electrode and the data lines of this embodiment. As shown in FIG. 11, the pixel electrode 80 is aligned with the left side of the first data line 86 and the right side of the second data line 88. The first branch electrode 82 electrically connecting to the pixel electrode 80 overlaps the first data line 86 with an area E. The second branch electrode 84 electrically connecting to the pixel electrode 80 overlaps the second data line 88 with an area F. The overlap areas E and F are the same.

Figure 12:
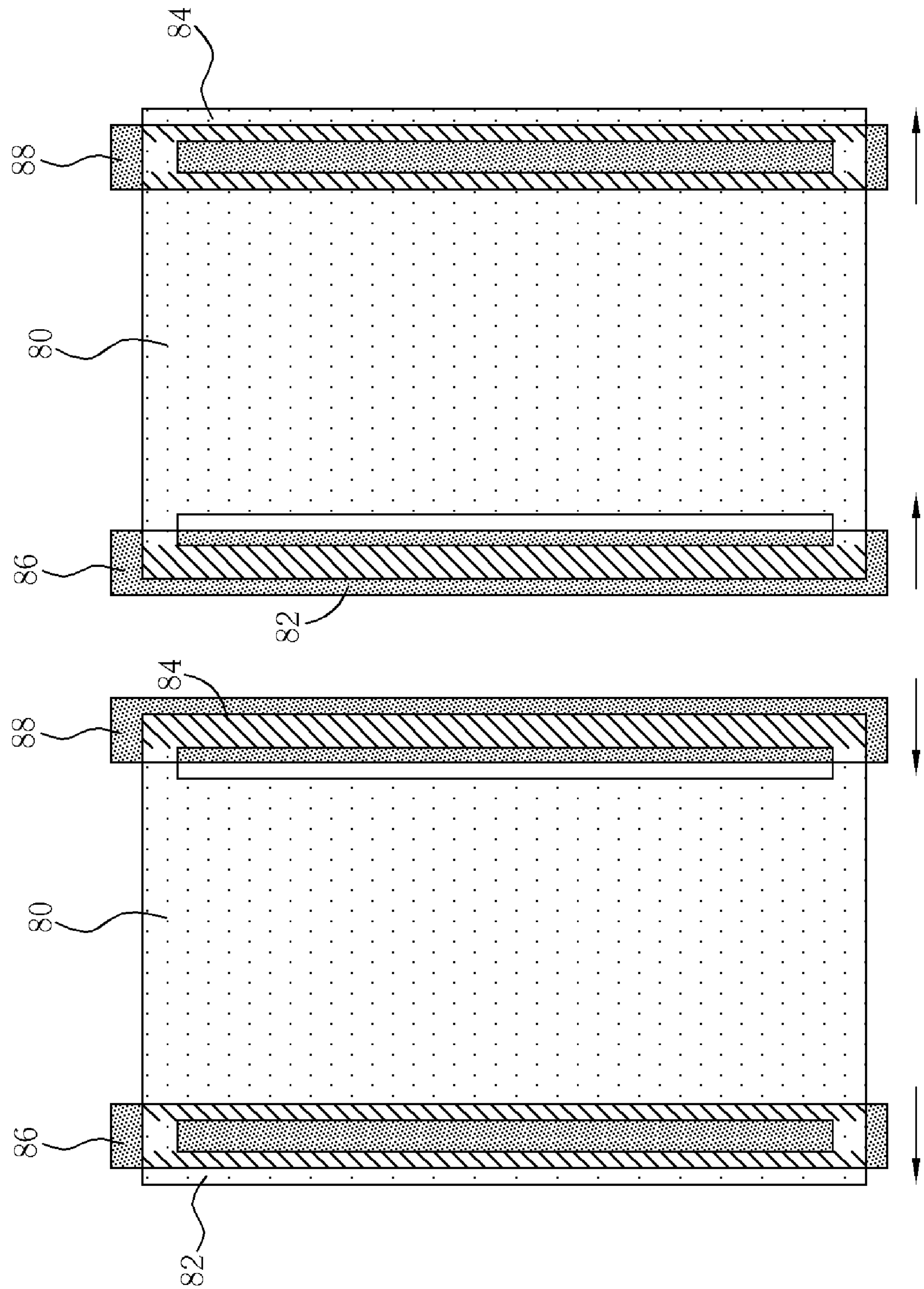
FIG. 12 is a plane view of the pixel area of the invention with overlay shift.

As shown in FIG. 12, when the pixel electrode 80 shifts to the left or to the right, the total overlap area between the first data line 86 and the first branch electrode 82 and the pixel electrode 80 is equal to the total overlap area between the second data line 88 and the second branch electrode 84 and the pixel electrode 80.

Fifth Embodiment

Figure 13:
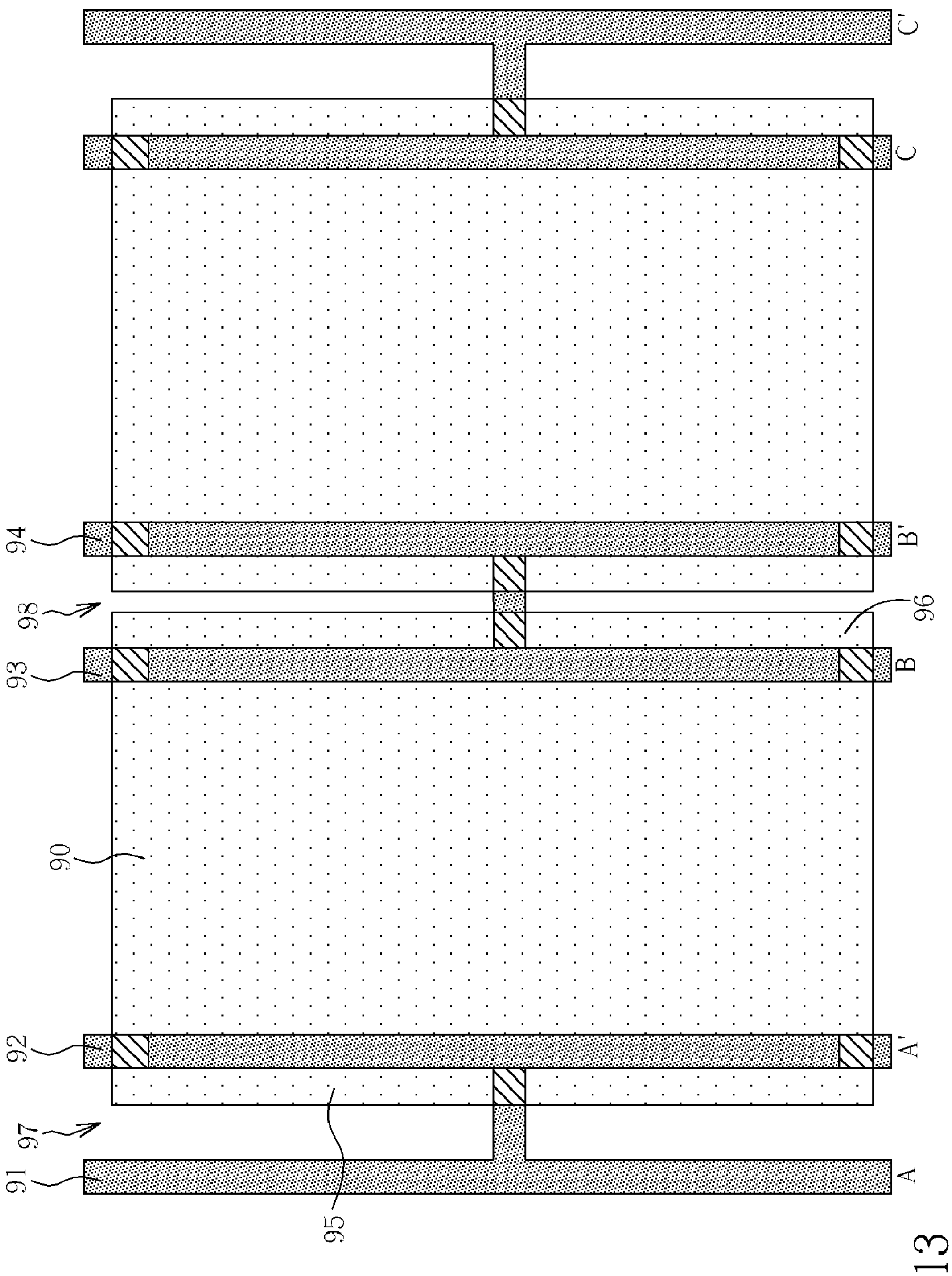
FIG. 13 is a plane view of the pixel electrode and the data line.

The compensation design for the overlay shift can be applied in the branch data lines. As shown in FIG. 13, the first branch data line 91 and the second branch data line 92 are electrically connected to form the first data line 97, and the third branch data line 93 and the forth branch data line 94 are electrically connected to form the second data line 98. The pixel electrode 90 is aligned to both the second branch data line 92 and the third branch data line 93. The first branch electrode 95 is aligned to the second branch data line 92 and the second branch electrode 96 is aligned to the third branch data line 93. Hence, when the pixel electrode 90 shifts to the left or to the right, the overlap areas compensate for the overlay shift. The other mask designs for the branch data lines are similar to the embodiments described earlier thus will not be described in detail.

In addition to the straight data line, the compensation design for the overlay shift can be also applied in the zigzag pattern data lines.

Sixth Embodiment

Figure 14:
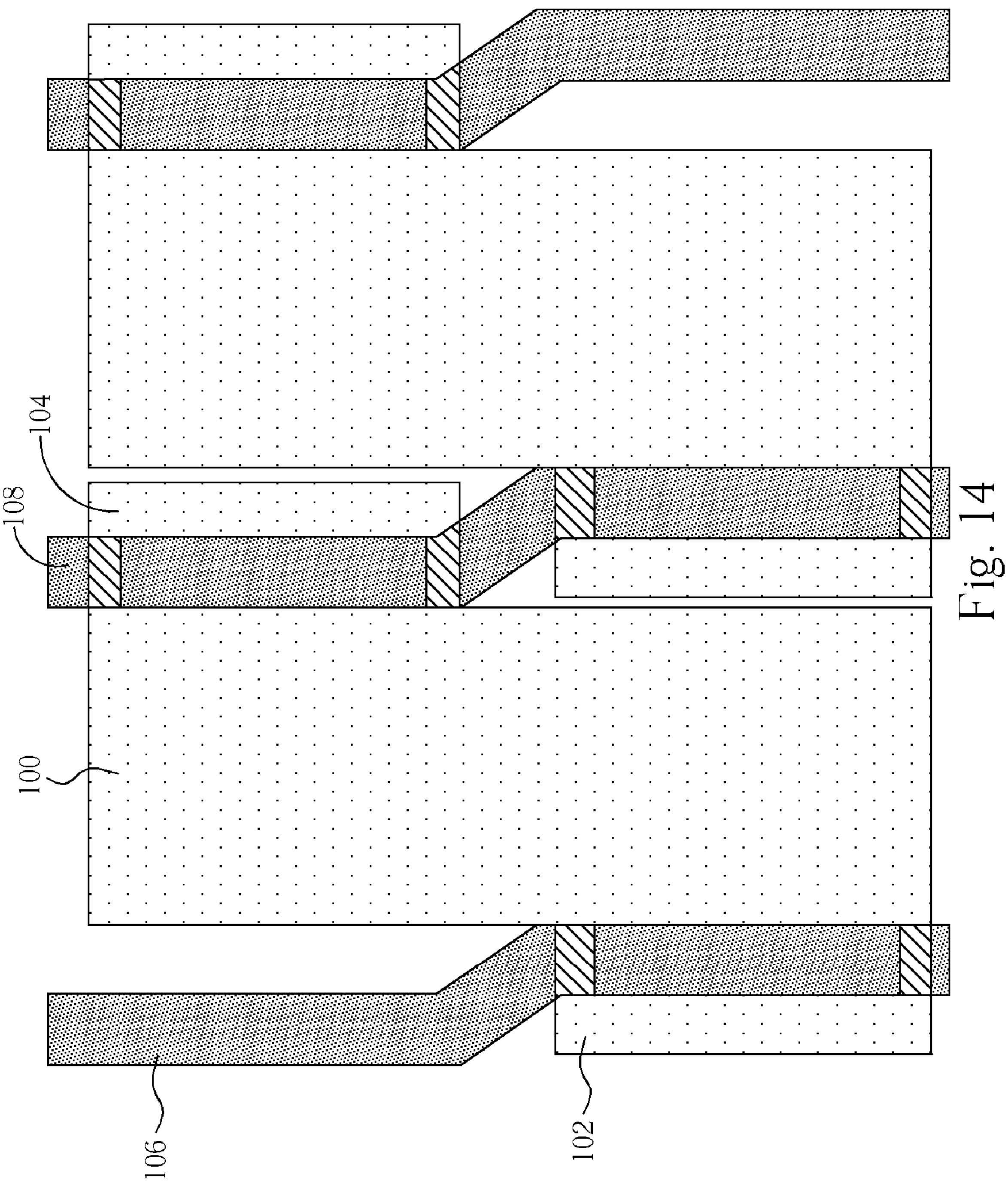
FIGS. 14 through 17 are plane views of the pixel electrode and the data line with zigzag data lines.

FIG. 14 shows the mask design of the pixel electrode and the zigzag data lines of this embodiment. As shown in FIG. 14, the pixel electrode 100 is partially aligned to the first zigzag data line 106 and the second zigzag data line 108. The first branch electrode 102 is aligned to the first zigzag data line 106 and the second branch electrode 104 is aligned to the second zigzag data line 108. Hence, when the pixel electrode 100 shifts to the left or to the right, the overlap areas compensate for the overlay shift.

Seventh Embodiment

Figure 15:
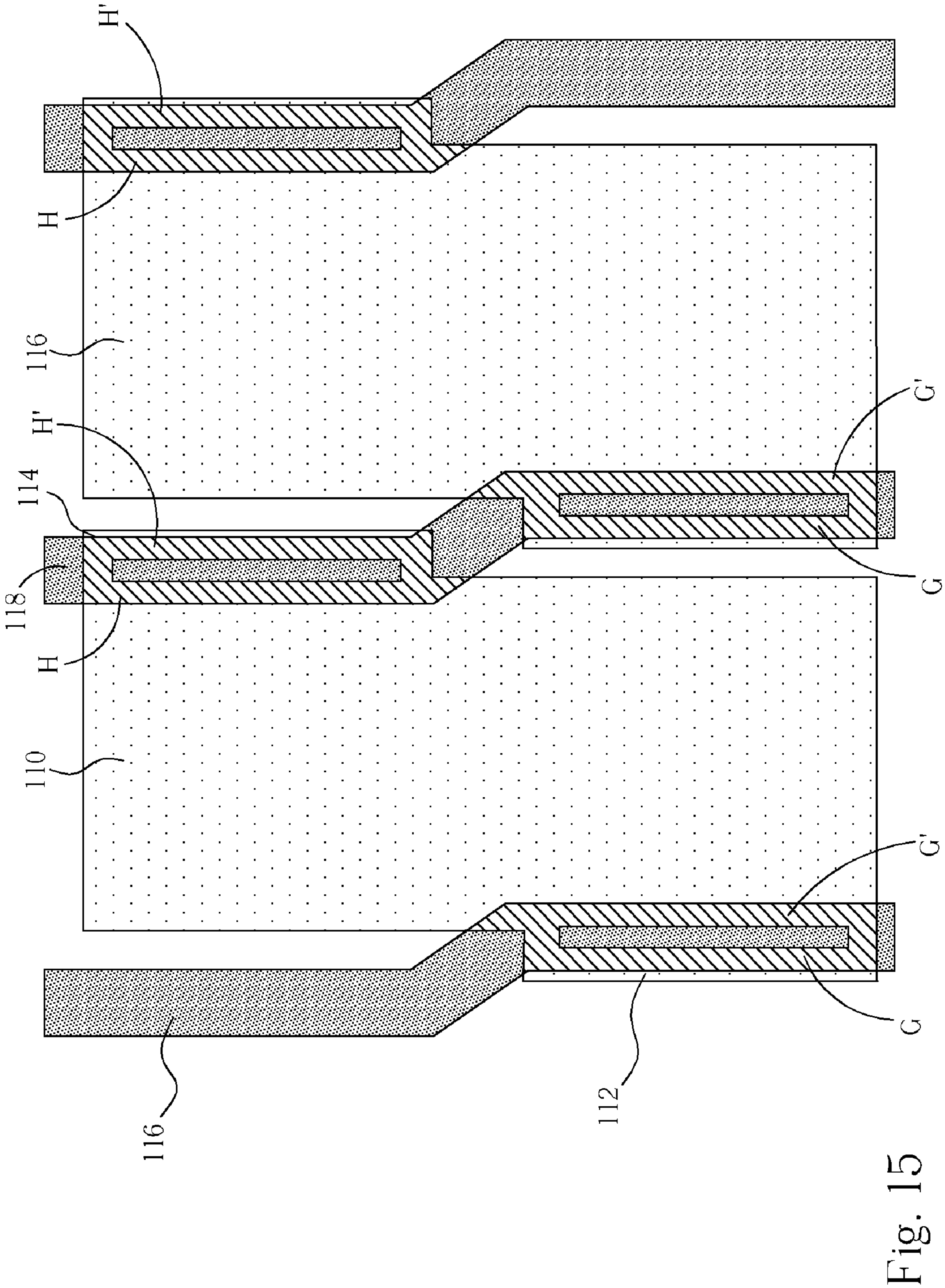

FIG. 15 shows the mask design of the pixel electrode and the zigzag data lines of this embodiment. As shown in FIG. 15, the pixel electrode 110 overlaps the first zigzag data line 116 with an area G' and the pixel electrode 110 overlaps the second zigzag data line 118 with an area H. The first branch electrode 112 overlaps the first zigzag data line 116 with an area G. The second branch electrode 114 overlaps the second zigzag data line 118 with an area H'. The summation of G and G' is equal to the summation of H and H'. When the pixel electrode 110 shifts to left or right, the overlap areas compensate for the overlay shift.

Eighth Embodiment

Figure 16:
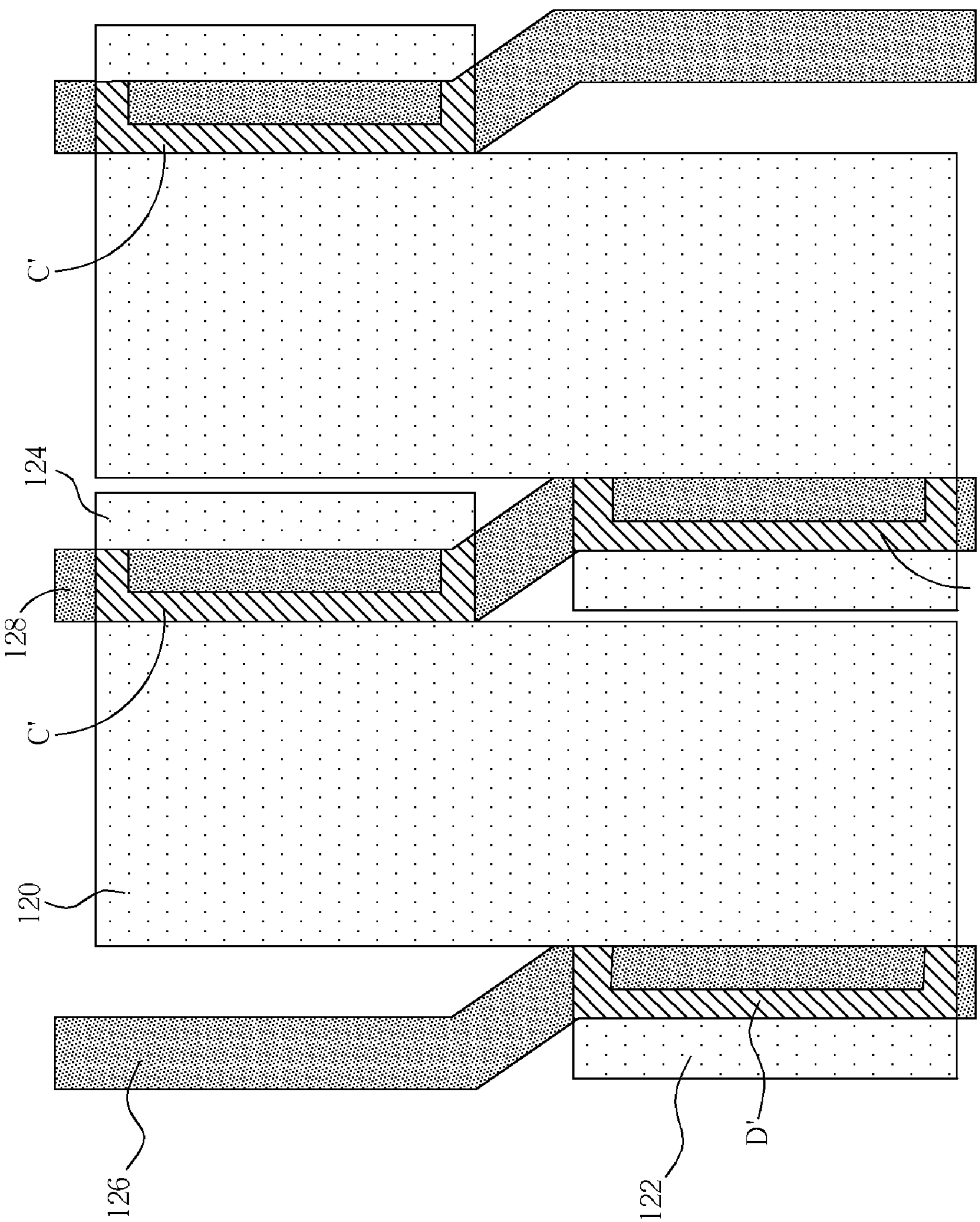

FIG. 16 shows the mask design of the pixel electrode and the zigzag data lines of this embodiment. As shown in FIG. 16, the pixel electrode 120 is aligned to the first zigzag data line 126 and the second branch electrode 124 is aligned to the second zigzag data line 128. The pixel electrode 120 overlaps the second zigzag data line 128 with an area C', and the first branch electrode 122 overlaps the first zigzag data line 126 with an area D', in which C' is equal to D'. The overlap areas can be disposed on the left side of both the first and second zigzag data line 126 and 128, or on the right side of both the first and second zigzag data line 126 and 128. When the pixel electrode 120 shifts to left or right, the overlap areas compensate for the overlay shift.

Ninth Embodiment

Figure 17:
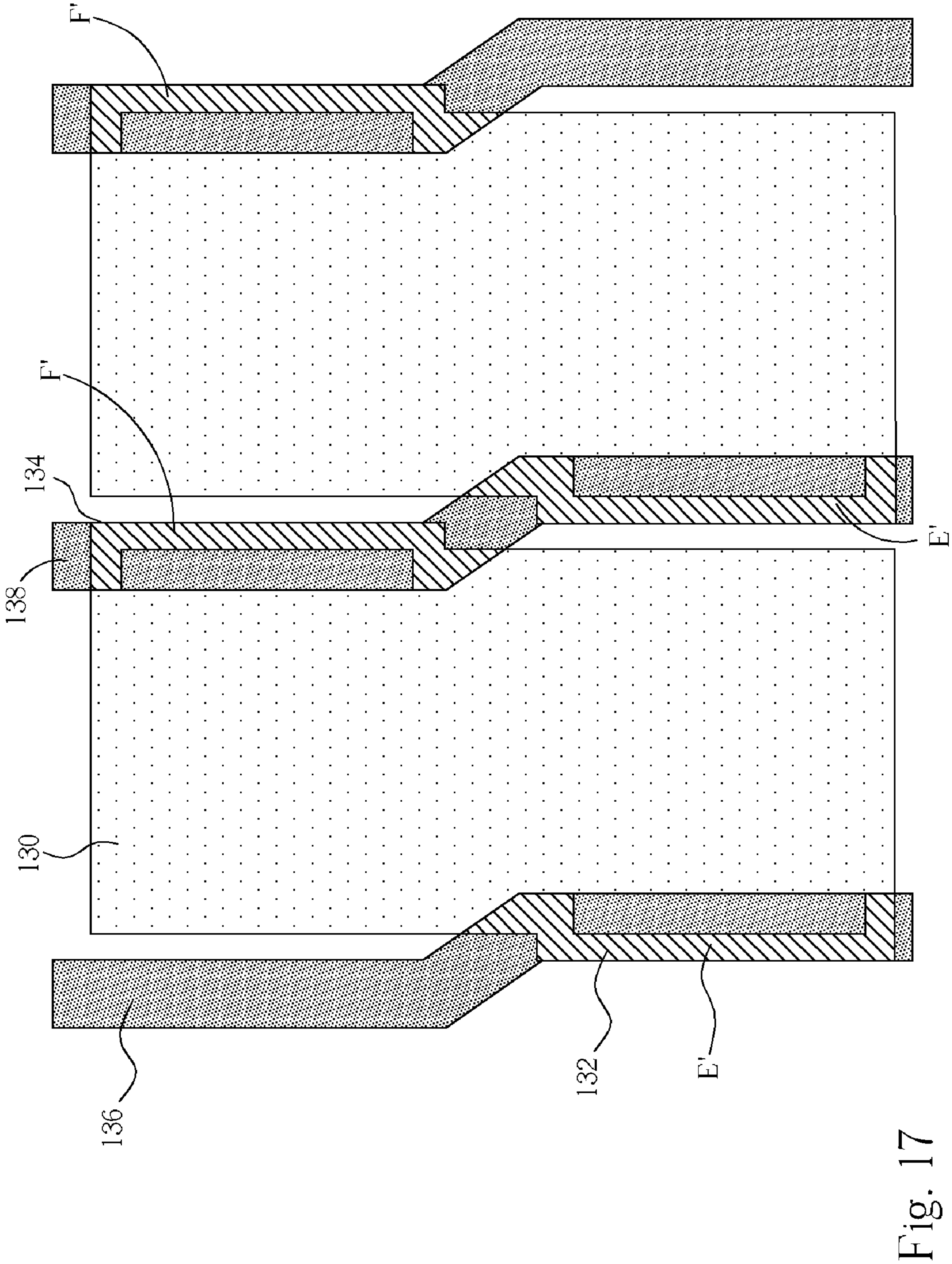

FIG. 17 shows the mask design of the pixel electrode and the zigzag data lines of this embodiment. As shown in FIG. 17, the pixel electrode 130 is partially aligned to both the first and second zigzag data line 136 and 138. The first branch electrode 132 overlaps the first zigzag data line with an area E'. The second branch electrode 134 overlaps the second zigzag data line 138 with an area F', and E' is equal to F'. When the pixel electrode 130 shifts to left or right, the overlap areas compensate for the overlay shift.

The mask design for the capacitance compensation can be applied in the delta array pixels in addition to the matrix array pixels. The preferred embodiments are described as below.

Tenth Embodiment

Figure 18:
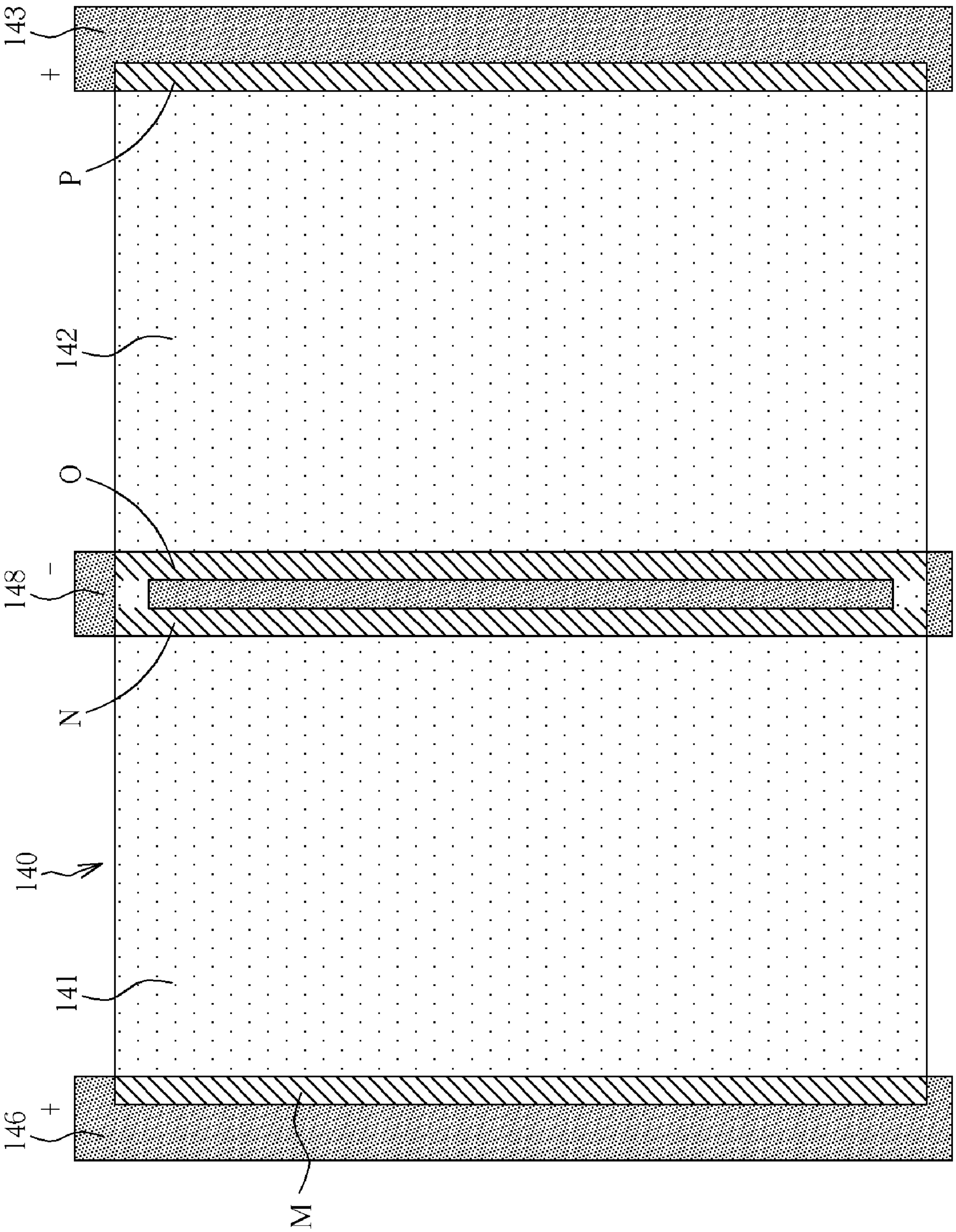
FIGS. 18 and 19 are plane views of the pixel electrode and the data line with delta.

FIG. 18 shows the mask design of the delta array pixel electrode and the data lines of this embodiment. As shown in FIG. 18, the pixel electrode 140 comprises the first subpixel electrode 141 and the second subpixel electrode 142. Preferably, the first subpixel electrode 141 and the second subpixel electrode 142 have a gap therebetween. The first subpixel electrode 141 overlaps the first data line 146 with an area M and overlaps the second data line 148 with an area N. The second subpixel electrode 142 overlaps the second data line 148 with an area O and overlaps the third data line 143 with an area P. The summation of N and O is equal to the summation of M and P, thereby minimizing ΔCpd. When the pixel electrode 140 shifts to left or right, the overlap areas compensate for the overlay shift.

Eleventh Embodiment

Figure 19:
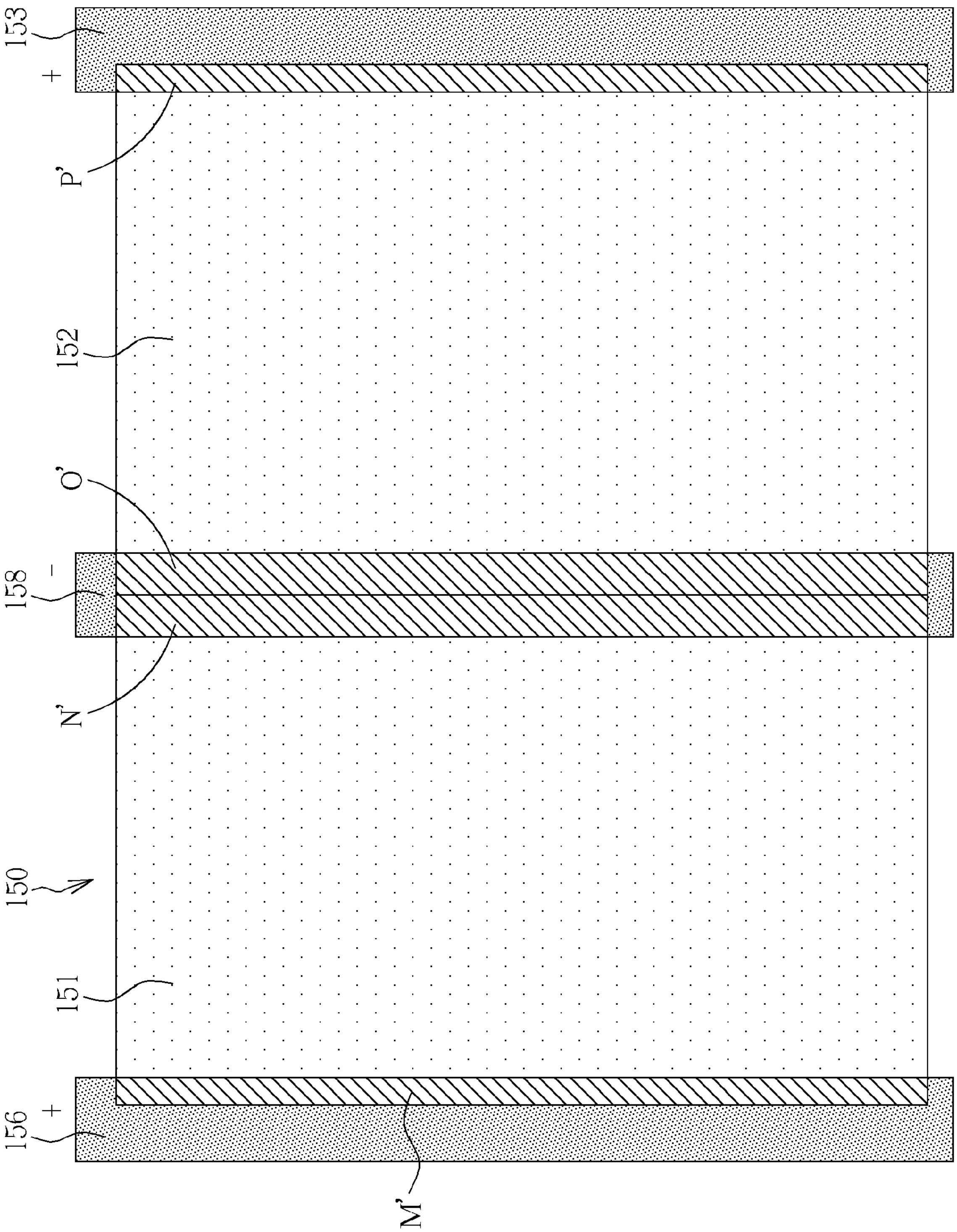

FIG. 19 shows another capacitance compensation design for the delta pixel array. As shown in FIG. 19, the pixel electrode 150 comprises the first the first subpixel electrode 151 and the second subpixel electrode 152. The first subpixel electrode 151 overlaps the first data line 156 with an area M' and overlaps the second data line 158 with an area N'. The second subpixel electrode 152 overlaps the second data line 158 with an area O' and overlaps the third data line 153 with an area P'. The summation of N' and O' is equal to the summation of M' and P', thereby minimizing ΔCpd. When the pixel electrode 150 shifts to the left or right, the overlap areas compensate for the overlay shift.

The embodiments described above are the compensation design for the overlay shift. Evidently, the branch electrodes are able to balance the parasitic capacitance effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display, comprising:

a substrate;

a plurality of pixel electrodes formed on the substrate;

a first data line and a second data line formed on the substrate;

a plurality of scan lines formed on the substrate, wherein the scan lines cross the first data line and the second data line;

a first branch electrode electrically connected to a pixel electrode and partially overlapping the first data line, wherein the first branch electrode and the pixel electrode have a first gap therebetween; and a second branch electrode electrically connected to the pixel electrode and partially overlapping the second data line, wherein the first branch electrode and the second branch electrode are disposed at opposite sides with respect to the pixel electrode and the second branch electrode and the pixel electrode have a second gap therebetween.

2. The liquid crystal display of claim 1, wherein:

the pixel electrode overlaps the first data line with a first area (A');

the pixel electrode overlaps the second data line with a second area (B);

the first branch electrode overlaps the first data line with a third area (A); and the second branch electrode overlaps the second data line with a fourth area (B');

wherein the first area and the third area (A+A') substantially equal to the second area and the fourth area (B+B').

3. The liquid crystal display of claim 1, wherein at least one of the first data line and the second data line comprises a zigzag pattern.

4. The liquid crystal display of claim 3, wherein:

the first branch electrode is disposed on an upper region of a first side of the pixel electrode; and the second branch electrode is disposed on a lower region of a second side of the pixel electrode, wherein the first side is opposite to the second side.

5. The liquid crystal display of claim 1, wherein:

the first data line comprises a first branch data line and a second branch data line, and the second branch data line is disposed between the first branch data line and the pixel electrode; and the second data line comprises a third branch data line and a fourth branch data line, and the third branch data line is disposed between the fourth branch data line and the pixel electrode.

6. The liquid crystal display of claim 5, wherein:

the pixel electrode partially overlaps the second branch data line; and the pixel electrode partially overlaps the third branch data line.

7. The liquid crystal display of claim 5, wherein:

the pixel electrode partially overlaps the first branch data line and the second branch data line; and the pixel electrode partially overlaps the third branch data line and the fourth branch data line.

8. A liquid crystal display comprising:

a substrate;

a plurality of pixel electrodes formed on the substrate and arranged in a manner corresponding to a delta pixel array;

a first data line, a second data line and a third data line formed on the substrate, wherein the second data line is disposed between the first data line and the third data line;

a plurality of scan lines formed on the substrate, wherein the scan lines cross the first data line, the second data line, and the third data line;

wherein at least one of the pixel electrodes comprises a first subpixel electrode and a second subpixel electrode, the first subpixel electrode electrically connects the second subpixel electrode, the first subpixel electrode partially overlaps the first data line and the second data line, and the second subpixel electrode partially overlaps the second data line and the third data line.

9. The liquid crystal display of claim 8, wherein:

the first subpixel electrode overlaps the first data line with a first area (M);

the first subpixel electrode overlaps the second data line with a second area (N);

the second subpixel electrode overlaps the second data line with a third area (O); and the second subpixel electrode overlaps the third data line with a fourth area P; wherein the first area and the fourth area (M+P) substantially equal to the second area and the third area (N+).

10. The liquid crystal display of claim 8, wherein the first subpixel electrode and the second subpixel electrode have a gap therebetween.

* * * * *